(12) United States Patent
Legatti (10) Patent No.: US 6,525,914 B1
(45) Date of Patent: Feb. 25, 2003

(54) PROTECTION SYSTEM FOR DEVICES CONNECTED TO AN ALTERNATING CURRENT ELECTRICAL POWER SUPPLY

(75) Inventor: Raymond H. Legatti, Clearwater, FL (US)

(73) Assignee: Technology Research Corporation, Clearwater, FL (US)

( * ) Notice: Subject to any disclaimer, the term of this patent is extended or adjusted under 35 U.S.C. 154(b) by 0 days.

(21) Appl. No.: 09/476,562

(22) Filed: Jan. 3, 2000

Related U.S. Application Data (60) Provisional application No. 60/136,037, filed on May 26, 1999, and provisional application No. 60/168,405, filed on Dec. 1, 1999.

(51) Int. Cl.[7] .............................................. H02H 5/04
(52) U.S. Cl. ....................................................... 361/42
(58) Field of Search ......................... 361/45, 42, 93.1, 361/115

(56) References Cited

U.S. PATENT DOCUMENTS

| | | | |
|---|---|---|---|
| 3,693,047 A | 9/1972 | Hamstra ................... 317/13 B |
| 4,171,944 A | 10/1979 | Hirschmann ................. 431/22 |
| 4,316,229 A | 2/1982 | Helwig ......................... 361/42 |
| RE31,147 E | 2/1983 | Helwig et al. ................ 361/42 |
| 4,464,582 A | 8/1984 | Aragaki et al. ............. 307/118 |
| 4,550,358 A | 10/1985 | Crowley et al. .............. 361/42 |
| 4,687,906 A | 8/1987 | Fujushima et al. ......... 219/364 |
| 4,763,365 A | 8/1988 | Gerondale et al. ............. 4/542 |
| 4,799,124 A | 1/1989 | Taylor et al. .................. 361/42 |
| 4,965,693 A | 10/1990 | Aoki ........................... 361/42 |
| 4,967,308 A | 10/1990 | Morse .......................... 361/42 |
| 5,013,891 A | 5/1991 | Shoemaker .................. 219/385 |
| 5,019,935 A | 5/1991 | Nakamura .................... 361/45 |
| 5,109,315 A | 4/1992 | Morse .......................... 361/42 |
| 5,508,568 A | 4/1996 | Mammen ..................... 307/117 |
| 5,590,010 A | 12/1996 | Ceola et al. ................... 361/93 |
| 5,710,408 A | 1/1998 | Jones ......................... 219/481 |
| 5,742,464 A | 4/1998 | Ceola et al. ................. 361/103 |
| 5,801,912 A | 9/1998 | Gershen et al. ............... 361/50 |
| 5,841,617 A | 11/1998 | Watkins et al. ............. 361/106 |
| 5,943,198 A | 8/1999 | Hirsh et al. ................... 361/42 |
| 5,943,199 A | 8/1999 | Aromin ........................ 361/42 |
| 5,966,280 A | 10/1999 | Cerminara et al. ........... 361/47 |
| 5,995,350 A | 11/1999 | Kopelman .................. 361/103 |
| 6,002,562 A | 12/1999 | Andis ........................... 361/87 |

Primary Examiner—Jessica Han
(74) Attorney, Agent, or Firm—Jon Carol Gealow

(57) ABSTRACT

A protective arrangement for an electrical device energized from an alternating current power supply which de-energizes the electrical device when undesirable conditions, develop within the electrical device. The protective arrangement, when provided for an electrical device having protection for undesirable leakage currents in the power cord supplying to electrical device, utilizes the same circuit interrupting device to de-energize the electrical device upon the occurrence of an undesirable condition, other than a leakage current, within the device, or upon the occurrence of an undesirable leakage current in the power cord supplying the electrical device.

29 Claims, 4 Drawing Sheets

PROTECTION SYSTEM FOR DEVICES CONNECTED TO AN ALTERNATING CURRENT ELECTRICAL POWER SUPPLY

This Application claims benefit to U.S. provisional application Ser. No. 60/136,037, filed May 26, 1999 which claims benefit to U.S. application Ser. No. 60/168,405, filed Dec. 1, 1999.

BACKGROUND OF THE INVENTION

FIELD OF THE INVENTION

The present invention relates to a system for de-energizing an electrical device, connected to an alternating current electrical power supply, when undesirable conditions, in addition to undesirable leakage currents in the power cord, develop within the electrical device. Such undesirable conditions may include among others, flames, too high of a temperature, a pressure deviating too far from normal, the presence of smoke or particulate matter or, the presence or absence of light or of a light opaque member within the device. Still another undesirable condition is the presence of an electrical potential on metal parts, such as the frame of the electrical device which could cause a leakage current.

The protection system of the present invention provides additional protection, not provided by prior systems, for electrical appliances and tools. In addition to providing protection from electrical leakage currents, and protecting a user from the hazard of electrical shock, it includes additional sensors for detecting and providing protection with respect to flames, smoke, excessively high temperatures, and abnormal pressures in the appliance or tool.

More particularly it relates to an enhancement of appliance leakage current interrupters (ALCIs) and equipment leakage current interrupters (ELCIs), to provide additional protection to a leakage current protected electrical device. More generally, it relates to an enhancement of any Leakage Current Protection Device as set forth in Underwriters Laboratories, Inc. Reference Standard UL943A, which includes not only ALCIs and ELCIs, but also immersion detection circuit interrupters (IDCIs). Whenever the term GFCI or ground fault circuit interrupter is used herein, it is intended in the broader sense of any leakage current protection device, where applicable.

BRIEF SUMMARY OF THE INVENTION

In accordance with this invention, the protection provided against leakage currents and arcing (generally referred to as arcing currents herein), either separate from or in connection with a GFCI, to an electrical device power delivery cord, is extended to the electrical device which is connected to a power supply through the power delivery cord. The extended protection encompasses not only leakage currents and arcing, but also other undesirable conditions which may occur in the electrical device. Typical of the electrical devices which may be protected in accordance with this invention are electric heaters, air purifiers, room air conditioners, water distillers, and such kitchen appliances as toasters, toaster ovens, bread makers, and coffee makers. The extended protection upon detection of unsafe or undesirable conditions indicated by abnormal light or source of light, temperature or pressure conditions, or the presence of flame or smoke will result in disconnecting the electrical device form its power source.

One embodiment of the protection system of this invention is for use with two wire electrical devices such as an appliance or tool, which receives electrical power through a power cord, which includes an unshielded power line, and an unshielded neutral line. As described in co-pending application Ser. No. 08/682,957, entitled: "Electrical System With Arc Protection", which application is assigned to the assignee of this application, and which application is hereby incorporated by reference, a sensing lead, substantially electrically isolated from the power and neutral lines and the electrical load of the appliance, is provided in the power cord. A sensing lead integrity checking device, such as a neon glow tube or a switch, may be connected between the sensing lead and the power line. The integrity checking device connects the power line to the neutral line through the sensing lead. The impedance of the integrity checking device is increased by substantial additional resistance, so that the current flow is very small, well below the predetermined magnitude that would initiate response of the arcing current protection arrangement. Thus, although the integrity checking device does provide a connection between the sensing lead and the power line, the power line and the sensing lead are only connected for a brief integrity checking period through a switch, or the total impedance between the power line and the sensing lead is so high that, for practical purposes of the arcing current protection arrangement, the sensing lead is isolated from the power line and the appliance or tool load.

A rectifier, such as a diode rectifier circuit, may be connected between the power line and the neutral line to provide DC power to a circuit opening device, such as a solenoid which actuates normally closed contacts in the power line. In most situations, it is also desirable to open the neutral line. In such situations, a second pair of normally closed contacts in the neutral line are actuated by the solenoid.

Energization of the solenoid coil may be controlled by a suitable switching device, such as a silicon controlled rectifier (SCR) having the anode-cathode circuit connected in series with the solenoid coil. The gate of the SCR coil may be connected to the cathode through a suitable resistance that will bias the SCR to a conducting state when current flow of a pre-determined magnitude passes through the resistance, thus providing a current responsive arrangement. The sensing lead is also be connected to the gate of the silicon controlled rectifier, usually through a limiting resistor. Of course, with a different type of circuit opening device, the sensing lead would be connected to the control circuitry therefor.

When an arding current above a predetermined magnitude is produced on the sensing lead, such as by detecting an arc resulting from a breakdown of the insulation separating the power line and the neutral line, the SCR will be gated to a conducting state and the solenoid will be energized to open the power line and, usually, the neutral line as well. Typically the leakage current detection level is set between a range of 250 micro-amperes and 5 milliamperes.

In accordance with this invention the sensing lead is electrically connected to the metal housing or frame of the electrical device. If there is a dielectric or insulation failure between the metal housing or frame and the power or neutral line, and a leakage current, tracking or arcing occurs with respect to the metal housing or frame of the electrical device, it will flow through the sensing lead to cause the SCR or other suitable switching device to be gated to a conducting state. Thus, the solenoid will be actuated by energization or de-energization, depending on the circuit configuration, to open the power line and usually, the neutral line as well. This embodiment of the arcing current protection arrangement may be used independently of a GFCI, although a GFCI would normally be included somewhere within the electrical system to protect against ground fault currents.

In a variation of the first embodiment of this invention a supplemental coil is placed on the core of the differential transformer of a GFCI. The sensing lead is connected to this supplemental winding, which is in turn connected to the neutral line through a suitable resistance. If an arcing current above a pre-determined magnitude should occur in the sensing lead, the current flow through the supplemental winding creates an imbalance in the differential transformer, which in turn produces a trip signal in the secondary winding of the differential transformer. The trip signal in the secondary winding initiates actuation of a circuit opening device to break the power line and protect against a hazardous condition that might be created by the arcing current.

The number of turns in the supplemental winding may be varied to adjust sensitivity to arcing currents. Thus, the magnitude of the arcing current at which the circuit opening device will be actuated may be adjusted in accordance with the desired protection. Typically the current detection level is set in the range of 250 micro amperes to 5 milliamperes. The resistance in series with the supplemental winding may also be adjusted to establish the predetermined magnitude of arcing current at which tripping is desired. Again, the metal housing or frame of the electrical device is connected to the sensing lead. As set forth with respect to the previous embodiment, if a current above a predetermined magnitude occurs in the sensing lead, due to a current flow between the metallic housing and the sensing lead, the trip signal in the secondary winding initiates actuation of a circuit opening device to break the power line and protect against the hazardous conditions that might be created by the arcing current.

Further protection is provided to an electrical device in accordance with this invention by de-energizing the device when an undesirable condition occurs in the device. The further protection is provided by causing a circuit to be completed to the sensing lead from the power line or from the neutral line in response to the occurrence of an undesirable condition in the electrical device. Various parameters, indicative of an undesirable or unsafe condition in the electrical device, may be detected, and if detected cause a circuit to be completed between the sensing lead and the power line or neutral line. Amongst the variety of parameters which may be sensed are light, temperature, flame, pressure and smoke. In accordance with this invention, simple low cost sensors may be used as detectors. Various arrangements may be used to complete the circuit between the sensing lead and the power line or neutral line. In one embodiment of this invention a normally closed switch connected in a circuit connecting the sensing lead to the power line or neutral line is held in an open position by a mechanical restraint. Upon the occurrence of an undesirable condition, the mechanical restraint is released. Closing of the normally closed switch contacts causes a current to flow in the sensing lead, which results in disconnecting the electrical device from the power source. Amongst the other low cost sensors which may be used in accordance with this invention are cadmium sulfide light detection cells, a combination of a light emitting diode and light sensitive semiconductor switch, and a pressure sensitive switch.

As an example of this embodiment of the invention, a switch normally biased to a closed position is held in an open position by a force applied through a tape formed of a heat sensitive material. When an undesirably high temperature is reached in the electrical device, the tape will stretch or disintegrate, thereby allowing the mechanical bias on the normally closed switch to move the switch contacts to the closed position. A resulting current flow through the normally closed switch contacts and the sensing lead will cause the electrical device to be disconnected from the power source.

A second embodiment of the protection system of this invention is for use with electrical devices such as appliances or tools having three lines, that is power, neutral and ground. It may also be used with three wire or line devices having a metal sheath or cover on the power cord. A ground fault current interrupter circuit with arcing protection for such three wire or line devices is set forth in U.S. Pat. No. 4,931,894—Legatti, which patent is assigned to the assignee of this application. U.S. Pat. No. 4,931,894 is hereby incorporated by reference. An appliance or tool having three lines would normally have its metal housing or frame connected to the ground line such that arcing to the metal housing or frame would be detected by the ground fault current interrupter circuit. Thus, a sensing lead need not be connected to the metal housing or frame to detect arcing thereto, as in the first embodiment. However, in accordance with the second embodiment of this invention, a sensing lead is provided for the purpose of providing a signal, representing an undesirable condition in the electrical device, to the leakage current protective device connected to the electrical device to open the power circuit to the electrical device. As in the first embodiment, the sensing lead may be connected to actuate a switching device such as a silicon controlled rectifier, or it may be connected to a supplemental coil on the core of a differential transformer of a GFCI.

DETAILED DESCRIPTION OF THE PREFERRED EMBODIMENT

Figure 1:
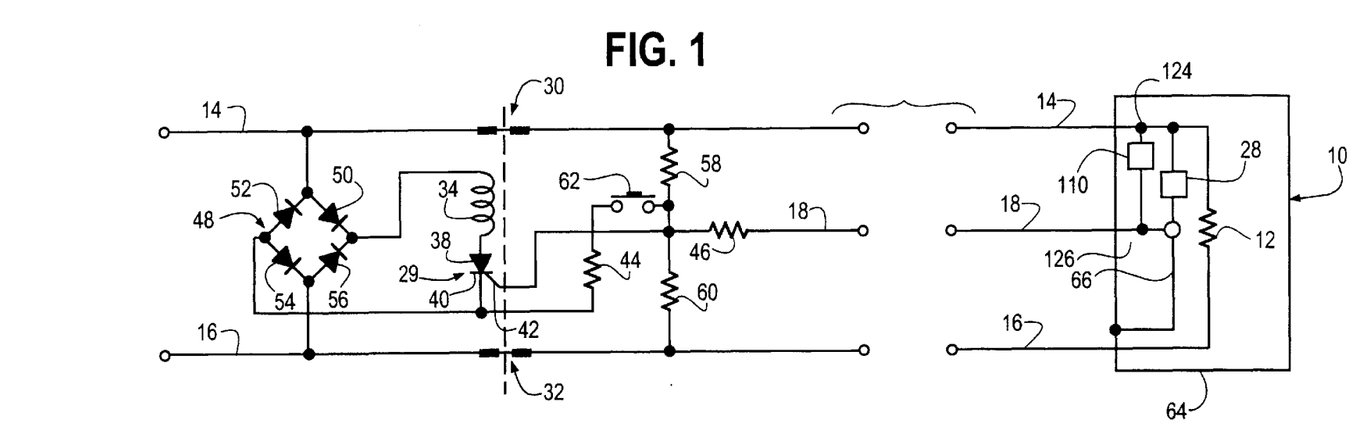
FIG. 1 is a schematic circuit diagram of a first preferred embodiment of the protection system of the present invention for devices connected to an alternating current electrical power supply through a leakage current protection device.

An electrically energized appliance 10 is schematically illustrated in FIG. 1. The electrically energized component(s) of appliance 10 are represented by an electrical load 12. The appliance is of the ungrounded double insulated type. Although referred to as the electrically energized component of an appliance 10, it should be recognized that the load 12 may be any type of electrical device, such as a tool or an electric heater utilizing a power cord as disclosed herein.

Figure 3:
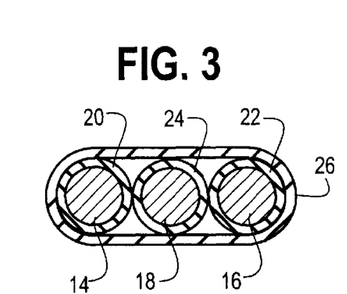
FIG. 3 is a schematic cross-sectional view of a flat appliance cord illustrating a sensing lead between the power line and the neutral line.

Electrical power for the load 12 of appliance 10 is obtained through an unshielded power line 14 and an unshielded neutral line 16. The power and neutral lines would normally be encompassed in some type of appliance cord, an example of which is illustrated in FIG. 3 hereof. Included in the appliance cord, with the power and neutral lines, is an unshielded sensing lead 18. Sensing lead 18 is located between the power line 14 and the neutral line 16. It is electrically isolated from the electrical load 12 and the power and neutral lines 14 and 16 respectively, by insulation 20 surrounding power line 14, insulation 22 surrounding neutral line 16, and insulation 24 surrounding sensing lead 18. All three conductors and their surrounding insulation are enclosed in insulating sheath 26.

In some situations, it may be desirable to provide an arrangement for checking the integrity of the sensing lead. Accordingly, an integrity checking device 28 may be connected between the sensing lead 18 and the power line 14. Any suitable type of integrity checking device, such as a neon glow tube with a current limiting resistor connected in series may be used. The impedance of the indicating device should be sufficiently large to limit the current flow through the integrity checking device to an amount well below the predetermined magnitude of arcing current flow selected for actuation of the arcing current protection arrangement. Integrity checking device 28 could also be a switch in series with a suitable current limiting resistor, in which case not only the sensing lead integrity but also the operation of the arc protection arrangement could be tested, if the resistance of the current limiting resistor is chosen so as to permit the flow of a current above the predetermined magnitude of arcing current flow selected for actuation of the arcing current protection arrangement.

The circuit opening device of the protection system may be located in the appliance cord, such as in the plug connected to the appliance cord. Placing the arcing protection in the locality of the appliance cord being protected, aids in minimizing nuisance tripping, which might otherwise occur, considering the low level of currents to which a response is desired.

Although any suitable type of circuit opening device may be utilized in this preferred embodiment, solenoid actuated normally closed contacts, illustrated as the normally closed contacts 30 in power line 14, are shown. In most applications, it would also be desirable to have the solenoid open normally closed contacts in the neutral line 16, as represented by the normally closed contacts 32.

Energization of a solenoid coil 34 is controlled by a suitable switching device, such as a silicon controlled rectifier (SCR) 369. The circuit of anode 38 and cathode 40 of SCR 36 is connected in series with the solenoid coil 34. Gate 42 of SCR 36 is connected to the sensing lead 18 and also to the cathode 40 through a resistor 44. A current limiting resistor 46 is connected between gate 42 of SCR 36 and sensing lead 18.

DC current for energizing the solenoid coil 34 is obtained from a rectifier 48. Any suitable rectifier circuit may be utilized. As shown, a full wave rectifier formed by diodes 50, 52, 54 and 56 is employed. Rectifier 48 is connected between power line 14 and neutral line 16 to provide direct current to the solenoid coil 34 and the anode-cathode circuit of the SCR 36.

When an arcing current in excess of a predetermined magnitude occurs in sensing lead 18, due for example, to a breakdown of the insulation between power line 14 and neutral line 16, the current through resistor 44 causes the gate 42 of SCR 36 to bias the anode-cathode circuit of SCR 36 to a conducting state. The resulting current flow through the solenoid coil 34 causes the normally closed switch 30 in power line 14 to be opened, as well as the normally closed switch 32 in neutral line 16, if provided. In this way, the existence of arcing currents in excess of the predetermined magnitude removes the power from appliance load 10 to prevent potentially hazardous conditions caused by the arcing currents.

A test circuit may be provided to check operation of the circuit opening device. This test circuit may utilize a simple switch and resistance connected in series between the power line 14 and the sensing lead 18. Although a single resistor could be employed, in this particular arrangement a pair of resistors 58 and 60 is employed, so that a change in the input polarity will not preclude testing. A manually actuatable switch 62 may be connected from the midpoint of resistors 58 and 60 to the gate 42 of SCR 36. When normally opened switch 62 is closed, a current in excess of the predetermined magnitude will flow through resistors 58 and 44 (or resistors 60 and 44 in the event of polarity reversal), which will bias gate 42 to trigger SCR 36 into conduction. Thus, the test circuit may be utilized to verify correct operation of the current responsive SCR 36 and the circuit opening solenoid coil 34.

In accordance with a first embodiment of this invention, the just described protection system, as set forth in U.S. patent application Ser. No. 08/682,957, which is hereby incorporated by reference, is enhanced to provide further protection by de-energizing the electrical device 10 when an undesirable condition, other than leakage currents in the power cord, arises in the electrical device 10. The undesirable condition, with respect to which further protection is provided by the first embodiment of this invention, is the presence of a potential on interconnected metal parts 64 of the appliance which are not intended to be connected to either the power line 14 or the neutral line 16. The presence of a potential on the interconnected metal parts could result in a leakage current flowing through a person touching the metal parts of the appliance. To provide for the de-energization of the appliance load 10, should a potential develop on the metal parts, represented in FIG. 1 by the enclosure 64, an electrical connection 66 is provided between the sensing lead 18 and the metal parts 64 of the appliance 10. Such a potential may develop as a result of failure of electrical insulation within the appliance, or by the inadvertent contact of a conductive object with one of the metal parts 64 and a conductive member in the appliance 10 which is connected to the power line 14 or the neutral line 16. If the potential is caused by the insertion of a conductive metal object into the appliance 10 so as to touch one of the lines 14 or 16 or a conductive part connected to those lines, and the metal parts 64, the current flow through the electrical connection 66 could be quite high. Thus, it may be desirable to increase the resistance of current limiting resistor 46, to reduce the current flow through electrical connection 66. An example of the potential being caused by contact with a conductive metal member would be the insertion of a metal knife or fork into a toaster, to extract a stuck item which is being toasted. The metal knife or fork could make contact both with the metal parts 64 and the energized heating elements.

Figure 2:
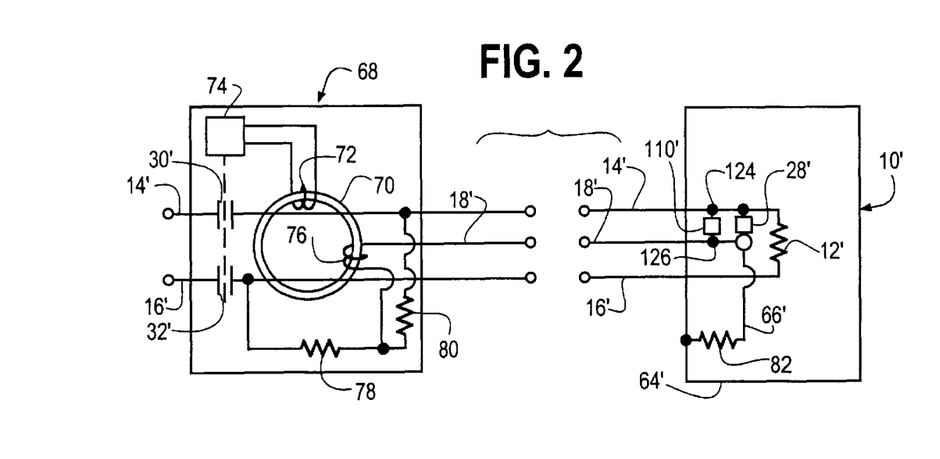
FIG. 2 is a schematic circuit diagram of a second preferred embodiment of the protection system of the present invention for devices connected to an alternating current electrical power supply through a leakage current protection device.

In accordance with a second embodiment of this invention, an arcing current protection arrangement, combined with a GFCI 68, as illustrated in FIG. 2 of U.S. patent application Ser. No. 08/682,957, is enhanced to provide further protection to an electrical device by de-energizing the electrical device 10 when an undesirable condition, other than leakage current in the power cord, arises in the electrical device 10. Referring to FIG. 2, a GFCI 68 employs a conventional differential transformer with a transformer core 70, in which the magnetic fluxes produced by the power line 14' and the neutral line 16' normally balance one another. (Portions of this circuit corresponding to the circuit of FIG. 1 are indicated by primed numerals.)

A secondary winding 72 is also located on the transformer core 70. If a differential in the flux produced by the current flowing in power line 14' and neutral line 16' is detected, the resultant signal produced in secondary winding 72 will cause a circuit opening device 74 to open the normally closed switch 30' in the power line 14', as well as the normally closed switch 32' in the neutral line 16', if used.

For use with an arcing current protection arrangement, a supplemental winding 76 is located on the differential transformer core 70. A pair of resistors 78 and 80 are connected in series between the power line 14' and the neutral line 16'. Supplemental winding 76 is connected between sensing lead 18' and the junction between resistors 78 and 80.

If an arcing current in excess of a predetermined magnitude is present in sensing lead 18', supplemental winding 76 will unbalance the flux in the core of the differential transformer and produce a signal in the secondary winding 72 to actuate the circuit opening device 74. In this way, the protection of the embodiment of FIG. 1 against undesired arcing currents is directly incorporated into the GFCI 68. The number of turns in supplemental winding 76 may be adjusted to actuate the circuit opening device at a desired level of current in sensing lead 18'. The windings on the transformer core may be configured to actuate the circuit opening devices for current flows in the sensing lead 18' of 2.5 milliamperes or less.

A test circuit (not shown), such as that illustrated in FIG. 1, may also be incorporated in this embodiment. Also, it should be noted that in some situations the sensing lead 18' could be the ground line (in a three line arrangement), so that a separate sensing lead would not be required.

In accordance with the second embodiment of this invention, the just described protection system, as set forth in U.S. patent application Ser. No. 08/682,957 is enhanced to provide further protection by de-energizing the electrical device 10' when an undesirable condition, other than leakage currents in the power cord, arises in the electrical device 10'. The undesirable condition with respect to which further protection is provided by the second embodiment of this invention is the presence of a potential on interconnected metal parts of the appliance which would result for example in a leakage current flowing through a person touching the metal parts of the appliance. To provide for the de-energization of the appliance load 12', should a potential develop on the metal parts, represented by the enclosure 64', an electrical connection 66' is provided between the sensing lead 18' and the metal parts 64' of the appliance 10'. Such a potential may develop as a result of a failure of electrical insulation within the appliance, or by the inadvertent contact of a conductive object with the metal parts 64' and a conductive member in the appliance 10' connected to the power line 14' or the neutral line 16'. If the potential is caused by a conductive metal object, the current flow through the electrical connection 66' could be quite high, such that it may be desirable to provide a current limiting device or resistor 82.

The first two embodiments of the present invention have been described in combination with a leakage current protection system for the power delivery cord of a electrical device which may include a ground fault circuit interrupter. The present invention may provide leakage current and arcing protection to an electrical device separate from a leakage current protection system for the power delivery cord of the electrical device, and without a ground fault circuit interrupter. For instance, the sensing lead 18 or 18' may be a fine wire of considerable small cross-section than the power line 14 or 14' and the neutral line 16 or 16', such that it would not necessarily provide leakage current and arcing protection to the power delivery cord, in accordance with the teachings of previously cited U.S. patent application Ser. No. 08/682,957, but would provide the necessary electrical flow path for leakage current and arcing protection of the electrical device.

Figure 4:
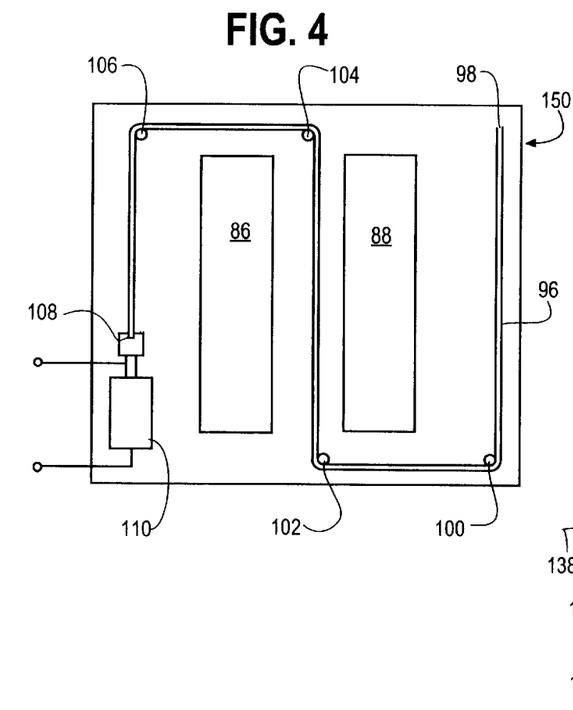
FIG. 4 is a top plan view of a toaster provided with a protection system in accordance with a third preferred embodiment of the present invention.
Figure 5:
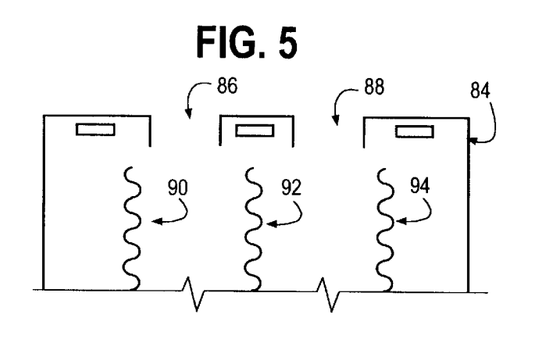
FIG. 5 is a partial side view of the toaster shown in FIG. 4.

A third embodiment of this invention is set forth, by way of example, as applied to a toaster, as illustrated in FIGS. 4 and 5. The toaster housing 84, is shown as having two opening 86 and 88 for receiving items to be toasted by heat produced by heating elements 90, 92, and 94. To protect the toaster against continued energization in the presence of an excessively high temperature in the toaster, or when flames develop therein, a heat or flame sensing arrangement is provided, which in conjunction with the protection arrangements illustrated in FIGS. 1 and 2, disconnects the toaster from the power supply. Heat or flame or both are detected by a ribbon 96 positioned under the top of the toaster. The ribbon is formed of a material which will disintegrate or stretch and/or break at a temperature which is considered excessively high, or when exposed to an open flame. An example of a material suitable for use as the ribbon 96 is Nomex®, a high temperature resistant synthetic aramid polymer insulating material manufactured by DuPont. The ribbon is secured at one end to a projection 98 extending from the bottom surface of the toaster top. The ribbon passes around guide posts 100, 102, 104 and 106, as is secured at the other end 108 to an extension of a movable contact of a normal closed switch 110.

Figure 6:
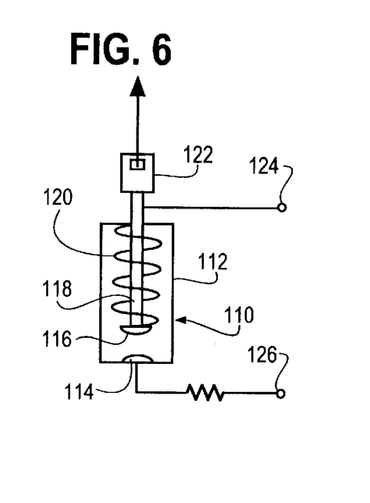
FIG. 6 is a schematic representation of a normal closed switch as employed in the third preferred embodiment of the present invention as shown in FIGS. 4 and 5.

The normally closed switch 110 is schematically represented in FIG. 6. The normally closed switch 110 is shown having a housing 112 which has a fixed contact 114 located at one end and a movable contact 116 supported on a member 118 which extends from the opposite end of the housing. A coil spring 120 surrounding member 118 exerts a force on movable contact 116 which, unless resisted, will cause the movable contact 116 to engage the fixed contact 114. An attachment device 122 is provided on the member 118, to which is secured other end 108 of the ribbon 96. The switch is secured in the toaster housing 84, such that with other end 108 of the ribbon secured to the attachment device 122, the force of coil spring 120 is overcome and the movable contact 116 is held away from fixed contact 114. Upon the occurrence of excess heat in the toaster, such as cause by ignition and resulting flames from an item placed in the toaster, the ribbon 96 will disintegrate and break or stretch such that it will no longer hold the movable contact away from the fixed contact. Rather, the force of the coil spring 120 will close the contacts resulting in a closed circuit between terminals 124 and 126.

In accordance with this embodiment of the invention, one of the terminals 124 or 126 is connected to the sensing lead 18 or 18' and the other terminal is connected to either the power line 14 or 14' or the neutral line 16 or 16'. One of the possible connections is illustrated in each of the FIGS. 1 and 2. Thus, the closing of the contacts 114 and 116 causes a potential to appear on the sensing lead 18 or 18', which as previously described results in the opening of normally closed switches 30 and 32 or 30' and 32'. By detecting the abnormal high temperature or the presence of flame in the toaster, the toaster may be disconnected from its power source prior to the "pop up" mechanism raising the burning toast and possibly dispersing burning embers into the area surrounding the toaster.

The detection of excessive heat or flames in a toaster in accordance with this invention will also reduce or eliminate the risk of causing a fire when the operating mechanism of a "pop up" toaster is inadvertently depressed to start the toaster with a piece of paper or other readily flammable material in the toast holder. In accordance with this invention, flames from the readily flammable material will result in the de-energizing of the toaster, such that the "pop up" mechanism will not be actuated to discharge the inflamed material from the toaster.

While the temperature sensing element has been illustrated as a ribbon, it is contemplated by this invention that the sensing element could take other forms, such as a pellet that melts or disintegrates in the presence of an excessively high temperature. Also, it could be in the form of a temperature responsive bimetal switch, taking the place of the ribbon 96 and the switch 110.

Figure 7:
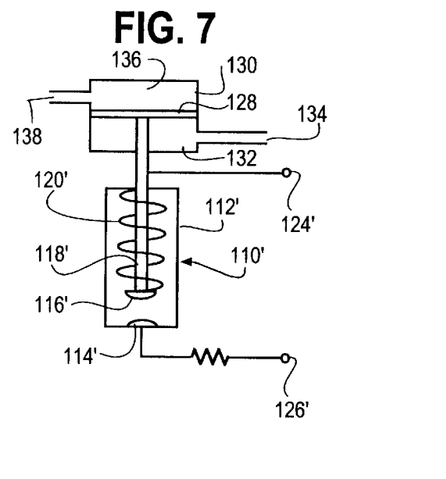
FIG. 7 is a schematic representation of a normal closed switch responsive to pressure as used a variation of the third preferred embodiment of the present invention.

In accordance with the third embodiment of this invention, other abnormal conditions in an electrical device could also be sensed for the purpose of disconnecting the device from the electrical power supply. For instance, an abnormal gas pressure in an electrical device could be sensed for the purpose of disconnecting the device from the electric power supply. As illustrated in FIG. 7, a normally closed switch 110' is shown having a housing 112' which has a fixed contact 114' located at one end and a movable contact 116' supported on a member 118' extending from the opposite end of the housing. A coil spring 120' surrounding member 118' exerts a force on movable contact 116', which unless resisted will cause the movable contact 116' to engage the fixed contact 114'. The member 118' is connected to a diaphragm 128 in a housing 130. Providing sufficient pressure exists in chamber 132 as applied through an inlet 134, the force of spring 120' will be overcome and the switch contacts will be maintained in an open position. Should a gas pressure in the electrical device, as provided to the chamber 132 through inlet 134, fall below a desired level, the pressure on diaphragm 128 will not be sufficient to overcome that of spring 120', and the contacts will close. As previously described, the closing of the contacts will result in the de-energization of the protected electrical device.

Similarly, in accordance with this invention an abnormally high pressure in an electrical device could be sensed for the purpose of disconnecting the device from an electrical power supply. Referring again to FIG. 7, spring 120' would be designed to hold the movable contact 116' in a spaced or open position with respect to contact 114'. However, if an abnormally high pressure is applied to a chamber 136 through an inlet 138, the force applied to diaphragm 128 will overcome the force of spring 120' and movable contact 116' will be moved into engagement with fixed contact 114'. Should a gas pressure in the electrical device, as provided to the chamber 136 through inlet 138, raise above a desired level, the pressure on diaphragm 128 will be sufficient to overcome that of spring 120', and the contacts 114' and 116' will be close. As previously described, the closing of the contacts will result in the de-energization of the protected electrical device.

Figure 8:
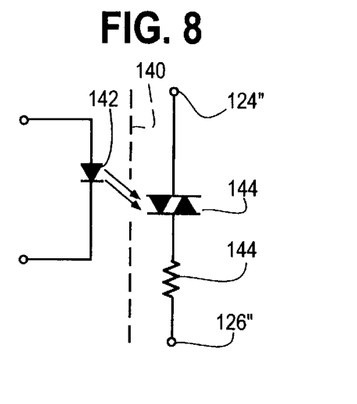
FIG. 8 is a schematic representation of a switch responsive to light as would be used in a variation of the third preferred embodiment of the present invention.

Another example of the sensing of an abnormal condition in an electrical device in accordance with this invention is set forth in FIG. 8. The sensing arrangement in FIG. 8 would be used to sense the destruction or removal of a light barrier 140 in the electrical device. A light emitting diode 142 is positioned to emit light on a light sensitive semiconductor switch 144, in the absence of light barrier 140. The light barrier is designed to be removed in the presence of an abnormal condition. For instance, the light barrier is formed of a thin sheet of opaque Nomex®, a high temperature resistant synthetic aramid polymer insulating material manufactured by DuPont, which disintegrates or stretches and or breaks at a temperature which is considered excessively high. When the light barrier is removed, light from light emitting diode 142 impinging upon light sensitive semiconductor switch 144 will cause the switch to conduct, thereby completing a circuit between terminals 124" and 126". As previously described, the closing of the circuit between terminals 124" and 126" will result in the de-energization of the protected electrical device, when incorporated in one of the embodiments shown in FIGS. 1 and 2.

Similarly, the circuit including the light sensitive semiconductor switch 144, could be reconfigured such that when light is impinging on it from light emitting diode 142, and the circuit between 124" and 126" is closed, it would result in opening the circuit between the sensing lead 18 or 18' and the power line 14 or 14'. In accordance with this embodiment of the invention, the development of sufficiently dense smoke within the appliance in the space between the light sensitive semiconductor switch 144 and the light emitting diode 142 would result in the light sensitive semiconductor switch 144 turning off, to open the circuit between the terminals 124" and 126". Thus closing the circuit between the sensing lead 18 or 18' and the power line 14 or 14', will result in the de-energization of the protected electrical device.

In accordance with a modification of the embodiment of this invention shown in FIG. 8, a photoelectric cell, such as a cadmium sulfide cell, is used as a sensor, rather than the combination of the light emitting diode and the light sensitive semiconductor switch. The cadmium sulfide cell like the light sensitive semiconductor switch is positioned to detect the presence of light or flame in the protected electrical device. The current produced by the cadmium sulfide cell in the presence of undesirable light or flame is provided to a circuit arrangement which results in the flow of a current in sensing lead 18 or 18', which as previously described results in the opening of normally closed switches 30 and 32 or 30' and 32'.

While the third embodiment of the present invention has been described in combination with a leakage current protection system for the power delivery cord of a electrical device which may include a ground fault circuit interrupter, the present invention may provide leakage current and arcing protection to an electrical device separate from a leakage current protection system for the power delivery cord of the electrical device, and without a ground fault circuit interrupter. For instance, the sensing lead 15 or 18' may be a fine wire of considerable small cross-section than the power line 14 or 14' and the neutral line 16 or 16', such that it would not necessarily provide leakage current and arcing protection to the power delivery cord. However, the sensing lead 18 would provide the necessary electrical flow path for both leakage current and arcing protection of the electrical device, and for the sensing of other abnormal conditions in accordance with the third embodiment of the present invention.

In still another embodiment of this invention, even further protection is provided by coupling a timing circuit in the appliance or tool with an appliance or tool ground fault circuit interrupter. Many appliances and tools are provided with timers for interrupting the electrical supply to the appliance or tool after a predetermined time interval. For instance, in the case of a pop-up toaster, after a predetermined time interval, the pop-up mechanism is actuated to raise the toast from the toaster, and to de-energize the toaster heating elements.

Figure 9:
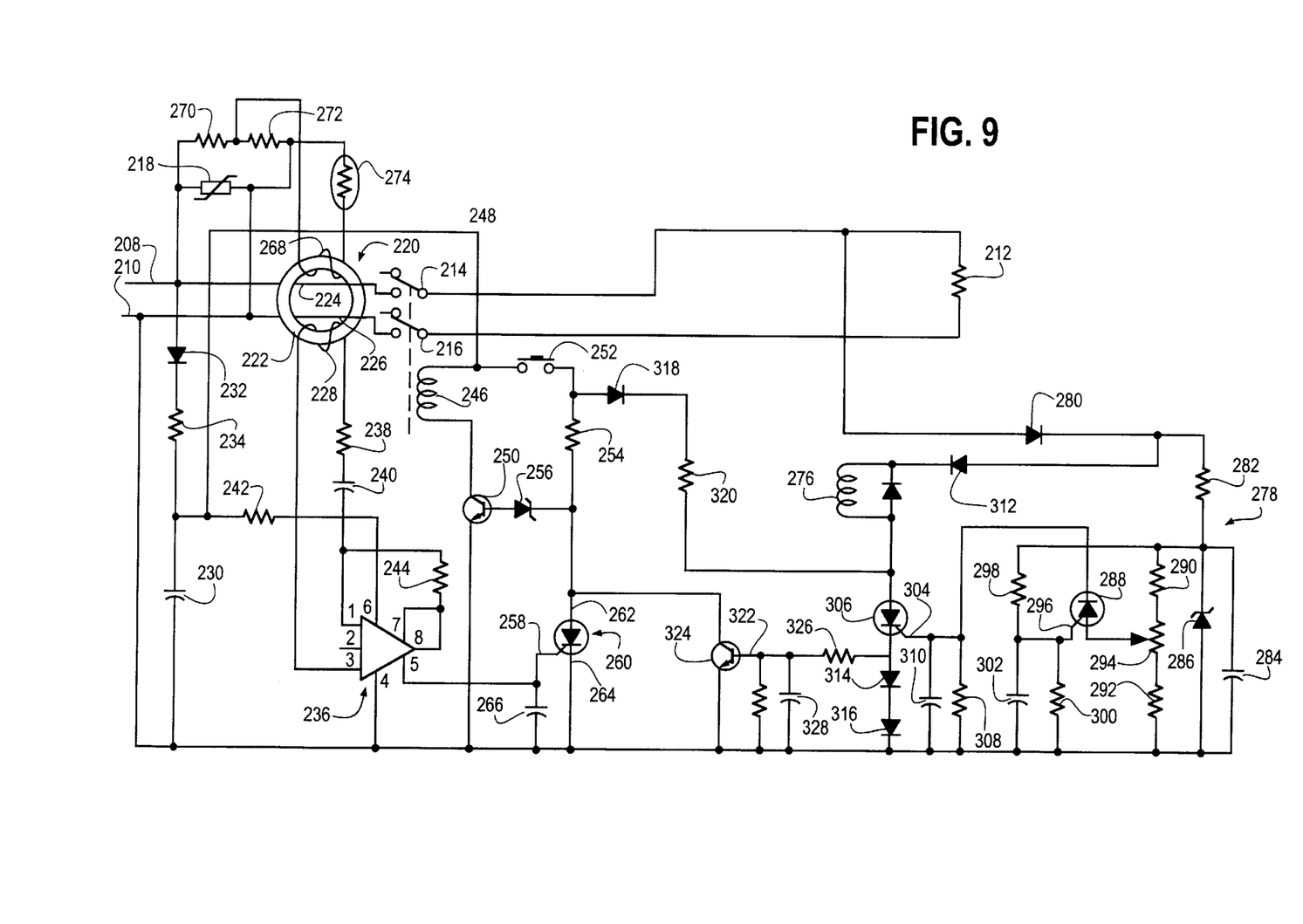
FIG. 9 is a schematic representation of still another embodiment of this invention as applied to a pop-up toaster.

Referring now to FIG. 9, a circuit diagram for providing additional protection to a pop-up toaster in accordance with this invention will be described. As shown in FIG. 9, the additional protection in accordance with this invention is provided with a GFCI similar to that shown in FIG. 1 of co-pending U.S. patent application Ser. No. 08/631,553, which application is assigned to the assignee of this application, and which application is hereby incorporated by reference. FIG. 1 illustrates a GFCI with a power line lead 208, and a neutral lead 210 supplying power to a toaster represented by load 212. A circuit opening contact 214 is located in power line lead 208, and a similar circuit opening contact 216 is located in the neutral lead 210. A metal oxide varistor 218 is connected between power line lead 208 and the neutral 210 to provide transient voltage protection.

The GFCI has a differential transformer 220. Differential transformer 220 has a magnetic core 222, with portions 224 and 226 of leads 208 and 210, respectively, passing through core 222 forming the primary windings of the differential transformer. The primary windings 224 and 226 are connected to produce opposing or "bucking" fluxes. Accordingly, if all of the load current returns through the neutral lead, the fluxes of the primary windings will cancel one another.

A secondary winding 228 is also located on the transformer core 222. if a ground current in excess of a predetermined size (e.g., 6 milliamperes) occurs, the fluxes produced by the primary windings 224 and 226 will not cancel and there will be a resulting flux flow in the core 222. This flux flow will induce a signal in the secondary winding 228, which is then conveyed to the GFCI control circuitry to open the power line and neutral lead.

A capacitor 230, connected in series with a diode 232 and a current limiting resistor 234 between power line lead 28 and neutral line 210 provides a direct current power source for the GFCI.

The signal induced in secondary winding 228 is conveyed to terminals 1 and 3 of an integrated circuit 236 that linearly amplifies and provides a stable output control or trip signal under varying conditions. A phase adjusting resistor 238 and a DC blocking capacitor 240 are connected in series from secondary winding 228 to terminal 1 of the integrated circuit 236.

A positive voltage supply is provided to terminal 6 of the integrated circuit 236 from capacitor 230 through resistor 242. Resistor 244 provides a feedback loop from terminals 7 and 8 of the integrated circuit 236 to terminal 1. Resistor 244 provides feedback gain control. The resistance of resistor 244 may be varied to adjust the ground current tripping level for the GFCI. This may be achieved by making the resistor 244 replaceable so that different magnitude resistors may be selectively utilized, or, alternatively, by using a variable resistor with selectable discrete settings. At the present time, settings for trip levels of 6 milliamperes, 10 milliamperes and 30 milliamperes are probably all that are required, but the number of discrete settings may be altered as needed or desired.

The contacts 214 and 216 of the GFCI are closed by enegization of a solenoid 246 from the capacitor 230 through lead 248, and the collector to emitter circuit of a transistor 250. The closing of a switch 252 will cause the transistor 250 to be forward biased by current flow through resistor 254 and zener diode 256, thus causing current flow through solenoid 246 and closing of contacts 214 and 216. Upon the detection of a current above the predetermined ground current tripping level, a signal from terminal 5 of the integrated circuit 236 will be applied to gate 258 of an SCR 260. The anode 262 to cathode 264 circuit of SCR 260 is connected between the junction of zener diode 256 and resistor 254. The signal from terminal 5 of the integrated circuit 236 supplied to the gate 258 of SCR 260 is also applied to capacitor 266, which provides a time delay in the triggering of conduction of SCR 260 by the application of a signal to gate 258. Conduction between anode 262 and cathode 264 of SCR 260 will remove the forward bias from transistor 250, such that collector to emitter current flow will be interrupted, as will the current flow through solenoid 246. Thus, the contacts 214 and 216 will be opened to de-energize the toaster represented by load 212.

The toaster is provided with flame detection by a circuit arrangement similar to that shown in FIG. 2. A supplemental winding 268 is located on differential transformer core 222. A pair of resistors 270 and 272 are connected in series between the power line 208 and the neutral line 210, in parallel with the metal oxide varistor 218. Supplemental winding 268 connected in series with a light sensitive element, such as a cadmium sulfide cell 274, are connected in parallel with resistor 272. The detection of a flame in the toaster by the cadmium sulfide cell 274 will cause the flow of a current in supplemental winding 268 which will be detected by secondary winding 228. As previously described, the current flow in secondary winding 228 will result in the opening of contacts 214 and 216. Thus, the toaster is provided with both ground fault and flame protection.

Still further protection is provided with respect to operation of the pop-up mechanism of the toaster. Switch 252 is closed upon lowering the toast carriage in a pop-up toaster to the toasting position. Closing the switch 252 will cause transistor 250 to be forward biased by the direct current voltage on capacitor 230 being applied to the base through lead 248 and resistor 254, thereby energizing solenoid 246 and closing of contacts 214 and 216. The closing of contacts 214 and 216 results in the energization of the toaster represented by load 212. The toast carriage is mechanically restraint in the lowered position until a carriage return solenoid 276 is energized. The energization of the carriage return solenoid is controlled by a timing circuit 278. The timing circuit is energized from the power line 208 through a diode 280 and a resistor 282 which supply direct current to charge a capacitor 284 to a voltage limited by a zener diode 286. The anode of a programable unijunction transistor 288 is connected to a voltage bridge comprising resistors 290, 292, and potentiometer 294, which is connected across capacitor 284. Gate 296 of programable unijunction transistor 288 is connected to the junction of resistors 298 and 300 which are also connected across the capacitor 284. A capacitor 302 is connected in parallel with resistor 300. The setting of potentiometer 294 may be adjusted to determine the time delay between the energization of the toaster and the conduction of programable unijunction transistor 288. Conduction of programable unijunction transistor 288 will cause the application of a potential to gate 304 of an SCR 306 and to resistor 308 and capacitor 310. Conduction of SCR 306 will provide a path for current flow through a diode 312, solenoid 276, and diodes 314 and 316. The energization of solenoid 276 should result in the actuation of the toast carriage to the raised position, and the opening of switch 252. However, failure of the mechanism to raise the toast carriage to the raised position would result in the switch remaining closed, and therefore the continued undesirable energization of the toaster. Even though the solenoid 276 is energized, and the mechanism to raise the toast carriage is operating properly, the toast carriage may be jammed in the lowered position by some object inserted in the toaster.

In accordance with this embodiment of this invention, further protection is provided to the toaster by causing the GFCI contacts 214 and 216 to be opened if the toaster carriage is jammed in the lower position, thereby preventing the opening of switch 252. With switch 252 in the closed position, voltage is supplied to the anode of SCR 306 through diode 318 and resistor 320. The voltage appearing across diodes 314 and 316 is applied to base 322 of a transistor 324 through a resistor 326. After a time delay caused by the charging of a capacitor 328 connected to the base 322, transistor 324 will be caused to conduct, thereby removing the forward bias from transistor 250, and causing solenoid 246 to be de-energized and therefor opening contacts 214 and 216.

Wherein the pop-up mechanism of the toaster is actuated by the timing circuit 278, should a flame be detected by the cadmium sulfide cell 274, or a leakage current be detected, so as to cause a current flow in secondary winding 228 which results in the opening of contacts 214 and 216, the timing circuit 278 will be de-energized, such that the carriage return solenoid 276 will not be energized. Thus, detection of a flame, excessive heat, or of a leakage current in the toaster prior to actuation of the pop-up mechanism by the carriage return solenoid 276, will prevent actuation of the pop-up mechanism. Thus, a shock to a person reaching for toast raised from the toaster in the case of a leakage current will be prevented. Similarly, in the case of detected flame or excessive heat, an excessively hot or flaming object in the carriage will not be discharged from the toaster, with a resultant greater likelihood of starting a fire near the toaster or causing heat damage to the material on which the excessively hot or flaming object lands. Rather, the excessively hot or flaming object will be retained in the toaster which has been de-energized.

Figure 10:
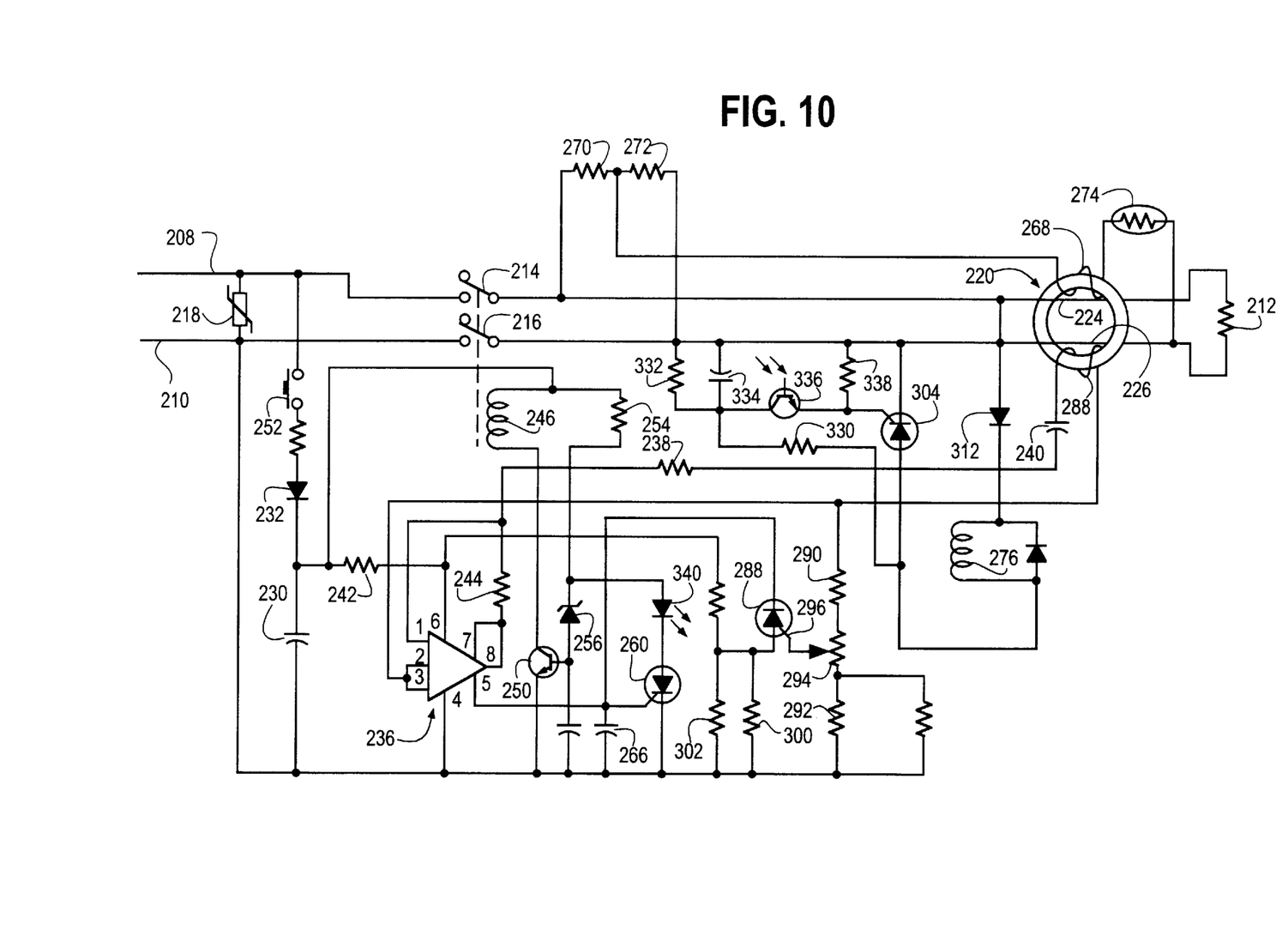
FIG. 10 is a schematic representation of a further embodiment of this invention as applied to a pop-up toaster, which is similar to that of FIG. 9.

Referring to FIG. 10, a circuit diagram of a further embodiment of this invention for providing additional protection to a pop-up toaster will be described. Major portions of the circuit of this embodiment are similar to those of FIG. 9, such that similar components of the circuit are identified by the same numerals in FIGS. 9 and 10. One difference between FIGS. 9 and 10, is that the differential transformer 220 is located on the load side of the circuit opening contacts 214 and 216, rather than on the source side as shown in FIG. 9. While the differential transformer 220 might be placed in either position in either of the embodiments shown in FIGS. 9 and 10, the usually preferred location is that shown in FIG. 10. Additional protection provided by the embodiment of the invention shown in FIG. 10, compared with that shown in FIG. 9, is that neutral line connection to the carriage return solenoid 276 is isolated from the neutral line connection of the remainder of the circuit, which is on the source side of the circuit opening contacts 214 and 216. Using this circuit arrangement, opening of the contacts 214 and 216 isolates the toaster carriage return solenoid 276 from both the power line 208 and the neutral line 210. In the circuit arrangement of FIG. 9, a connection of the neutral line 210 to the toaster carriage return solenoid 276 is maintained even after the circuit opening contacts 214 and 216 are opened. The elimination of such a connection may be a requirement of standards such as those set by Underwriters Laboratories, Inc.

To provide the desired isolation of the energization of toaster carriage return solenoid 276, it is connected between the power line 208 and the neutral line 210 on the load side of the contacts 214 and 216 in series with diode 312 and the anode to cathode circuit of SCR 304. Connected in parallel with the anode to cathode circuit of SCR 304 are series connected resistors 330 and 332, with a capacitor 334 being connected in parallel with resistor 332. The junction of the series connected resistors 330 and 332 is connected to the collector of a light sensitive transistor 336, the emitter of which is connected the gate of SCR 304. A resistor 338 is connected between the gate of SCR 304 and neutral line 210.

Conduction of SCR 260 causes a current flow through a light emitting diode 340. The light sensitive transistor 336 and light emitting diode 340 are positioned such that light emitted by the diode 340 impinges on the light sensitive transistor 336 to cause it to conduct. Conduction of light sensitive transistor 336 causes a signal to be applied to the gate of SCR 304, causing in turn the conduction of SCR 304 and of the energization of carriage return solenoid 276. Thus, the same protective features are offered by the circuit of FIG. 10, as offered by the circuit of FIG. 9, but with the additional benefit of isolating the carriage return solenoid energization circuit from the remainder of the protection circuit, the neutral of which is supplied from the source side of the circuit opening contact 216.

Several embodiments of the present invention have been described, wherein the power delivery cord is set forth as having unshielded power 14 and neutral line 16 and a sensing line 19 and shown in FIG. 3. The previously described embodiments of the present invention are also applicable to an electrical device provided with shielded power and neutral lines. Each of the power line 14 and the neutral line 16 could be separately shielded, or a single shield could surround both lines. In either case, both of the shields surrounding power line 14 and neutral line 16, or the single shield surround both lines could be utilized as the sensing lead 18 in practicing the previously described embodiments of this invention.

While several embodiments of the invention have been shown, it should be apparent to those skilled in the art that what have been described are considered at present to be preferred embodiments of the protection system for devices connected to an alternating current electrical power supply of this invention. In accordance with the Patent Statute, changes may be made in the protection system for devices connected to an alternating current electrical power supply without actually departing from the true spirit and scope of this invention. The appended claims are intended to cover all such changes and modification which fall in the true spirit and scope of this invention.

What is claimed is:

1. A protective arrangement for an electrical device energized from an alternating current power source through a power cord including at least a pair of power leads and a third conductive lead comprising: a circuit interrupter which disconnects the electrical device from the power source upon the flow of a current of a magnitude greater than a predetermined magnitude in the third conductive lead, a sensor system in said electrical device for sensing an undesirable condition in said electrical device, the detection of an undesirable condition in the electrical device by said sensor system causing a current to flow through the third conductive lead, such that when said current flow is greater than said predetermined magnitude, the electrical device will be disconnected from the power source.

2. The protection arrangement for an electrical device of claim 1, wherein said sensor system upon the detection of an undesirable condition causes an electrical connection to be established between one of said power leads and said third conductive lead to cause a current of a magnitude greater than said predetermined magnitude to flow in said third conductive lead, whereby said circuit interrupter will disconnect the electrical device from the power source.

3. The protection arrangement for an electrical device of claim 1, wherein said sensor system includes a pressure sensing device.

4. The protection arrangement for an electrical device of claim 1, wherein said sensor system includes a flame sensing device.

5. The protection arrangement for an electrical device of claim 4, wherein said sensor system includes an electrical switch actuated by the exposure of a heat sensitive material to flame in the protected electrical device.

6. The protection arrangement for an electrical device of claim 4, wherein said sensor system includes a photoelectric cell for detecting the presence of flame in the protected electrical device.

7. The protection arrangement for an electrical device of claim 1, wherein said sensor system includes a light emitting diode and a light sensitive semiconductor switch which detect a change in the light transmission between said light emitting diode and said light sensitive semiconductor switch to cause a current flow, greater than said predetermined magnitude, through said third conductive lead.

8. The protection arrangement for an electrical device of claim 1, wherein said sensor system includes a heat sensing device.

9. The protection arrangement for an electrical device of claim 1, wherein said third conductive lead is also the ground lead for the electrical device.

10. The protection arrangement for an electrical device of claim 1, wherein said sensor system includes an electrical connection between a conductive portion of the electric device which is not electrically connected to either of the pair of power leads, and the third conductive lead.

11. The protection arrangement for an electrical device of claim 1, wherein said third conductive lead is a sensor lead, such that the flow of a leakage current therein, greater than said predetermined magnitude, from a power lead, will cause the electrical device to be disconnected from the power source.

12. The protection arrangement for an electrical device of claim 1, wherein said circuit interrupter and said third conductive lead provide a leakage current protective device for said power cord.

13. The protective arrangement for an electrical device of claim 1, wherein the electrical device includes a solenoid which is energized a predetermined period of time after the electrical device is energized, to cause actuation of a mechanism, and opening of a switch to de-energize the device, and failure of said mechanism to be actuated, and of said switch to be opened, upon energization of said solenoid causing said protective arrangement to disconnect the electrical device from the power source.

14. The protective arrangement for an electrical device of claim 13, wherein detection of an undesirable condition in the electrical device, in less than said predetermined period of time, will disconnect the electrical device from the power source, such that said solenoid will not be energized.

15. The protective arrangement for an electrical device of claim 13, wherein the electrical device is a pop-up toaster, and energization of said solenoid releases a pop-up mechanism to raise a toast carriage, and to open said switch, failure of said pop-up mechanism to raise the toast carriage and to open said switch upon energization of said solenoid causing said protective arrangement to disconnect the electrical device from the power source.

16. The protective arrangement for an electrical device of claim 15, wherein detection of an undesirable condition in the pop-up toaster, in less than said predetermined period of time after the pop-up toaster is energized, will disconnect the pop-up toaster and prevent energization of said solenoid and release of said pop-up mechanism.

17. A protective arrangement for an electrical device energized from an alternating current power source through a power cord including at least a pair of power leads and a third conductive lead comprising: a circuit interrupter which disconnects the electrical device from the power source upon the flow of a current of a magnitude greater than a predetermined magnitude in the third conductive lead, said third conductive lead being connected to a conductive portion of the electrical device, which is electrically insulated from the pair of power leads, such that the flow of an electrical current from a power lead to the conductive portion of the electrical device will flow through the third conductive lead and will disconnect the electrical device from the power source upon the flow of a current greater than said predetermined magnitude.

18. A protective arrangement for an electrical device energized from an alternating current power source through a power cord including at least a pair of power leads and a third conductive lead electrically insulated from each other by electrical insulation, comprising: a circuit interrupter which disconnects the electrical device from the power source upon the flow of a current of a magnitude greater than a predetermined magnitude in the third conductive lead, a sensor system in said electrical device for sensing an undesirable condition in said electrical device, the detection of an undesirable condition in the electrical device by said sensor system causing a current to flow through said third conductive lead, the failure of the electrical insulation between the power leads and said third conductive lead resulting in a leakage current flow in said third conductive lead, such that when said current flow in said third conductive lead is greater than said predetermined magnitude, the electrical device will be disconnected from the power source.

19. The protection arrangement for an electrical device of claim 18, wherein said sensor system upon the detection of an undesirable condition causes an electrical connection to be established between one of said power leads and said third conductive lead to cause a current of a magnitude greater than said predetermined magnitude to flow in said third conductive lead, whereby said circuit interrupter will disconnect the electrical device from the power source.

20. The protection arrangement for an electrical device of claim 18, wherein said sensor system includes a pressure sensing device.

21. The protection arrangement for an electrical device of claim 18, wherein said sensor system includes a flame sensing device.

22. The protection arrangement for an electrical device of claim 21, wherein said sensor system includes an electrical switch actuated by the exposure of a heat sensitive material to flame in the protected electrical device.

23. The protection arrangement for an electrical device of claim 21, wherein said sensor system includes a photoelectric cell for detecting the presence of flame in the protected electrical device.

24. The protection arrangement for an electrical device of claim 18, wherein said sensor system includes a light emitting diode and a light sensitive semiconductor switch which detect a change in the light transmission between said light emitting diode and said light sensitive semiconductor switch to cause a current flow, greater than said predetermined magnitude, through said third conductive lead.

25. The protection arrangement for an electrical device of claim 18, wherein said sensor system includes a heat sensing device.

26. The protection arrangement for an electrical device of claim 18, wherein said third conductive lead is also the ground lead for the electrical device.

27. The protection arrangement for an electrical device of claim 18, wherein said sensor system includes an electrical connection between a conductive portion of the electric device which is not electrically connected to either of the pair of power leads, and the third conductive lead.

28. The protection arrangement for an electrical device of claim 18, wherein said third conductive lead is a sensor lead, such that the flow of a leakage current therein, greater than said predetermined magnitude, from a power lead, will cause the electrical device to be disconnected from the power source.

29. A protective arrangement for an electrical device energized from an alternating current power source through a power cord including at least a pair of power leads and a third conductive lead electrically insulated from each other by electrical insulation, comprising: a circuit interrupter which disconnects the electrical device from the power source upon the flow of a current of a magnitude greater than a predetermined magnitude in the third conductive lead, said third conductive lead being connected to a conductive portion of the electrical device, which is electrically insulated from the pair of power leads, such that the flow of an electrical current from a power lead to the conductive portion of the electrical device will flow through the third conductive lead, as will a leakage current resulting from the failure of the electrical insulation between the power leads and the third conductive lead, whereby the electrical device will be disconnected from the power source upon the flow of a current greater than said predetermined magnitude.

\* \* \* \* \*